April 15, 1952 F. J. ARMSTRONG 2,592,527
FILTER
Filed Dec. 7, 1945 2 SHEETS—SHEET 1

INVENTOR
Francis J. Armstrong
BY
Blair, Curtis + Hayward
ATTORNEYS

April 15, 1952     F. J. ARMSTRONG     2,592,527
FILTER
Filed Dec. 7, 1945     2 SHEETS—SHEET 2
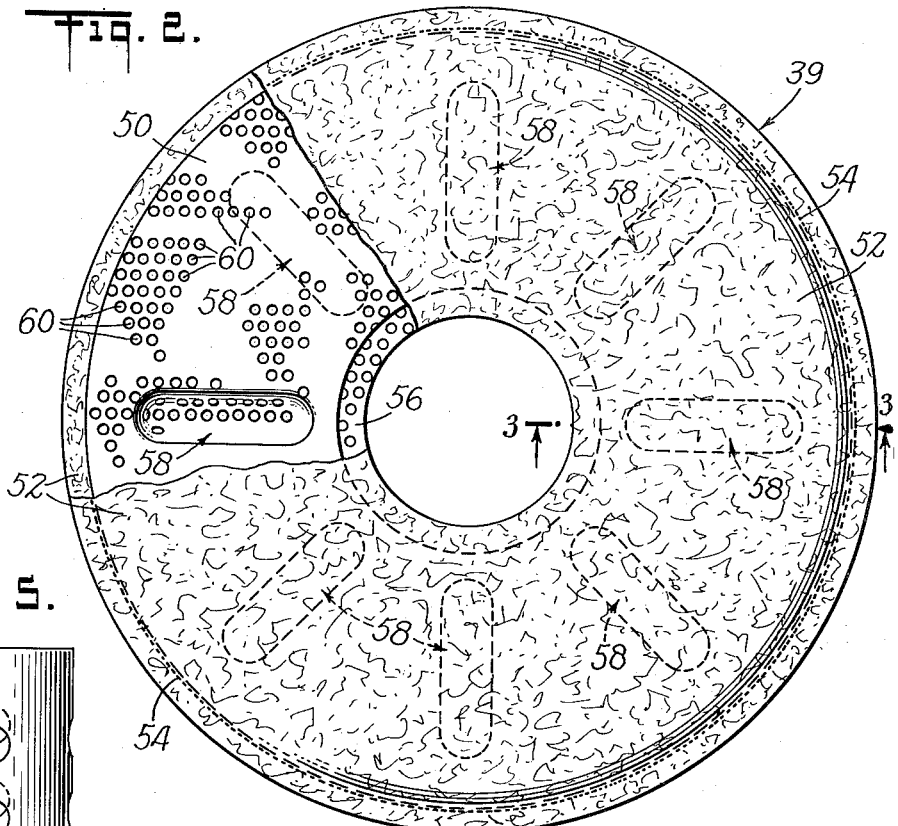
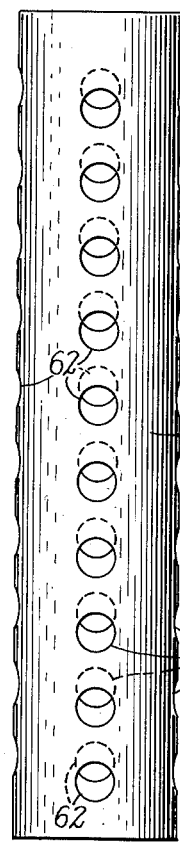
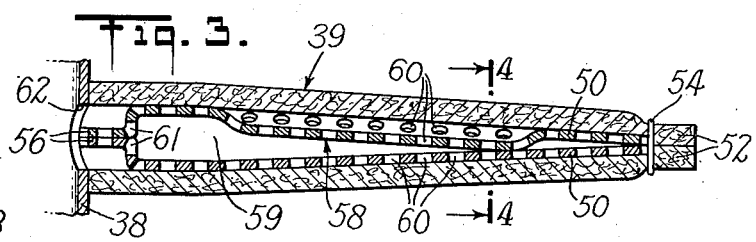
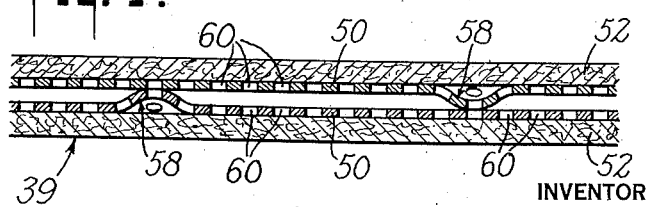
INVENTOR
Francis J. Armstrong
BY
Blair, Curtis + Hayward
ATTORNEYS Patented Apr. 15, 1952

2,592,527

UNITED STATES PATENT OFFICE 2,592,527

FILTER

Francis J. Armstrong, Syracuse, N. Y., assignor to United States Hoffman Machinery Corporation, New York, N. Y., a corporation of Delaware Application December 7, 1945, Serial No. 633,343

5 Claims. (Cl. 210—181)

1

This invention relates to filters, and more in particular to a disposable disc filter for use in filtering the lubricating oil in an internal combustion engine.

An object of this invention is to provide a filter which is light in weight, sturdy in construction, inexpensive to manufacture and maintain, and which is readily adaptable for use under a wide variety of conditions. A further object is to provide a filter of the above character which will operate with maximum efficiency for long periods of time, and wherein the filter elements may be readily replaced or cleaned, for example, after a predetermined period of operation or when residue has collected on the filter elements to such an extent as to interfere with the operation. A further object is to provide a filter unit of the above character which will operate efficiently under normal conditions but which will not stop the flow of liquid through it under emergency conditions as when the filter elements are covered by residue. A further object is to provide a disposable filter element which is inexpensive to manufacture and which will meet the most rigid demands in commercial use. These and other objects will be in part obvious and in part pointed out below.

The invention accordingly consists in the features of construction, combinations of elements, and arrangements of parts as will be exemplified in the structure to be hereinafter described and the scope of the application of which will be indicated in the following claims.

In the drawings:

Figure 2 is a plan view of a single filter element;

Figure 3 is a sectional view on the line 3—3 of Figure 2;

Figure 4 is a developed sectional view on the line 4—4 of Figure 3; and,

Figure 5 is a side elevation of a mandrel tube of the embodiment of Figure 1.

Figure 1:
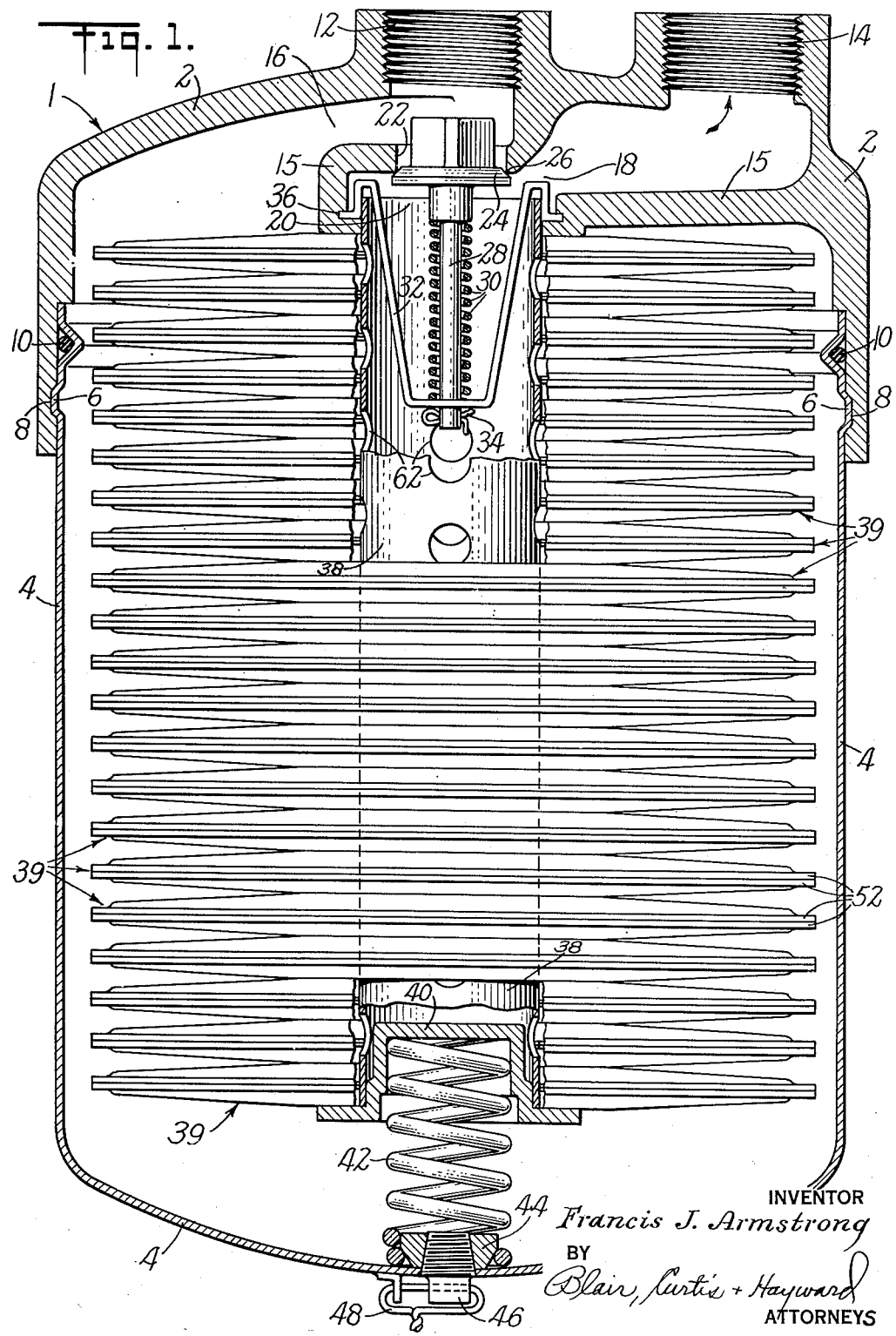
Figure 1 is a longitudinal sectional view of a filter unit representing one embodiment of the invention.

Referring particularly to Figure 1 of the drawings, a cylindrical filter casing 1 is formed by a base 2 of cast metal and a removable shell 4 of heavy sheet metal which is telescoped into the base. The telescope connection is provided by eight bosses 6 and mating bayonet slots 8 equally spaced around the casing. A synthetic rubber sealing ring 10 is carried in a groove at the top of the shell to seal the joint. At the center of base 2 is an inlet opening 12 which is threaded to receive an oil supply pipe or coupling. An oil outlet opening is provided at the right at 14 and this opening is similarly threaded to receive an outlet pipe or coupling.

Base 2 is provided with a partition 15 which forms at the left a passageway 16 from inlet opening 12 into the main portion of casing 1, and partition 15 also provides an outlet passageway 18 between outlet opening 14 and a central circular opening 20 in the partition. Partition 15 has a valve opening 22 in alignment with an adjacent inlet opening 12, and this opening is normally closed by a valve 24 which rests on a valve seat 26. Valve 24 has a stem 28 which projects from the valve toward the center of the casing, and the valve is urged against the valve seat by a compression spring 30 coiled about the valve stem. A U-shaped bracket 32 has a hole through its base in which the end of valve stem 28 is held by a cotter pin 34.

The ends of the bracket are bent back and thence radially outwardly, as shown, and they project into an annular groove formed in partition 15 around opening 20. Bracket 32 is resilient so that its ends are spring-urged into groove 36; and, additionally, after the filter unit has been fully assembled (as shown), a mandrel tube 38 has its end projecting in between the ends of the bracket so that the ends of the bracket cannot move radially inwardly; thus, the ends of the bracket cannot be flexed from groove 36 until the mandrel tube is removed. Mandrel tube 38 carries twenty-one filter discs 39 which are of the type shown in detail in Figures 2, 3 and 4, and are described in detail below. At the end of the mandrel tube opposite bracket 32 is a flanged cup 40, the flange portion of which overlies the end of the tube and is welded to the tube, and the cup portion of which receives the end of a compression spring 42. The opposite end of spring 42 has an end turn of reduced diameter which extends around a collar 44, which collar is welded to the bottom of shell 4 and which is beveled, as shown, so that the spring is held to the collar. Collar 44 is threaded to receive a drain plug 46 which is normally held from turning by a frangible wire seal 48 but which may be removed for draining or purging the filter unit.

Each of the filter discs 39 is formed by two identical metal discs 50 and two enclosing felt discs 52 which are stitched together at their peripheries at 54. The main portion of each of discs 50 is frusto-conical, but at the center the discs are offset toward each other to provide mating flanges 56. Thus, the two discs contact each other at their inner and outer peripheries and form an annular space 59 between them which is triangular in radial section. Each disc is further provided with four radial reenforcing bosses 58, one of which is shown in radial section in Figure 3 and two of which are shown in transverse section in Figure 4. The bosses on one disc are positioned equidistant between the bosses on the other disc so that reliable support is provided to hold the discs in spaced relationship with the result that the annular space 59 is maintained even though the filter discs are subjected to considerable pressure.

Discs 50 are provided throughout their surfaces with perforations 60 with the result that the two felt discs are supported on the metal discs and liquid may pass through the felt readily and thence through perforations 60 into the annular space 59 between the metal discs. At the inner peripheries of discs 50 these holes are designated 61 and they provide an outlet for oil at the inner edge of the annular space 59. As shown best in Figure 5, mandrel tube 38 is provided with forty radial holes 62 which are equally spaced in a spiral around the mandrel tube so that each filter disc on the tube (see Figure 1) is open at its inner edge through two or more of holes 60 to the center of the mandrel tube. Thus (see Figure 3), the liquid which enters the annular space 59 between the metal discs 50 flows toward the axis of the discs and through the holes 61 at the inner periphery of the discs, and thence through holes 62 into the mandrel tube 38.

Referring again to Figure 1, spring 42 exerts a compressing force through the flange on cup 40 which holds the filter discs tightly together adjacent their inner peripheries. Thus, the felt discs form a seal between adjacent filter discs so that the unfiltered liquid in the main portion of casing 1 is sealed from the filtered liquid in mandrel 38. The end of mandrel 38 adjacent bracket 32 is free to move with respect to the bracket so that the compression of the filter discs is not interfered with.

In practice the liquid to be filtered, which is illustratively the lubricating oil in an internal combustion engine, is pumped into the inlet opening 12 and out of the outlet opening 14. Thus, the main portion of casing 1 is filled with unfiltered oil, and due to the difference between the higher pressure of this unfiltered oil and the lower pressure of the filtered oil in mandrel tube 38 and in the annular spaces 59 in the filter discs, the oil flows through the filter discs, as indicated, into the mandrel tube at a fairly rapid rate. The residue solids in the oil is deposited upon the outer surfaces of the felt discs and in the felt discs so that clean oil flows from the outlet opening 14. After the filtering operation has continued for a sufficient time to cause a deposit on the felt discs which is sufficient to interfere with the desired rate of flow of oil, the filter discs are removed and replaced by clean discs. In order to do this shell 2 is removed by rotating it slightly, to release the bayonet joints, and then pulling the shell 4 away from the base 2. This action of removing the shell is assisted by spring 42 but the compression of this spring is not sufficient to cause difficulty after the shell is released. After the shell is released, the filter discs and the mandrel tube are removed and the discs are replaced by clean discs. The filter unit is then reassembled and is in condition for use again.

The filter unit is normally used in the upright position shown with the base at the top, and when it is desirable to purge the system, drain plug 46 may be removed. During use, the pressure on the outside of the discs assists spring 42 in holding a tight seal at the inner peripheries of adjacent discs. Under some circumstances the filter unit may be used for a long period of time before it is necessary to replace the discs. The discs which are removed may be disposed of or cleaned, depending upon the particular circumstances.

If at any time, the filter discs do not pass oil at a rate sufficient to satisfy the demand, the excess pressure developed on valve 24 will unseat this valve pushing it open against the action of spring 30. This permits oil to flow directly from the inlet opening 12 through the valve opening 22 to the outlet opening 14. Thus, the filter unit is effective so long as it can pass sufficient oil to meet the demand, but if for any reason the filter unit cannot meet this requirement, oil will still be supplied by virture of the opening of valve 24.

As many possible embodiments may be made of the above invention and as many changes might be made in the embodiment set forth, it is to be understood that all matter hereinbefore set forth, or shown in the accompanying drawing, is to be interpreted as illustrative and not in a limting sense.

I claim:

1. A filter element comprising, a pair of rigid discs formed of perforated sheet metal and each having a main portion which is frusto-conical with a flange portion at its inner periphery which flange portion is offset axially to provide spacing means, said discs being in face-to-face relationship whereby their flanges are in engagement with each other and their outer peripheries are in engagement with each other and an annular space is provided between the discs which is substantially triangular in radial cross-section, and a pair of felt discs positioned respectively on the opposite sides of the rigid discs with the felt discs overlying and engaging one another at the outer peripheries of the rigid discs and with the felt discs being stitched together at their outer peripheries whereby a self-sealing filter element is provided which drains readily through the perforations in the rigid discs and thence from the annular space at the inner peripheries of the metal discs.

2. A filter element comprising, a pair of rigid discs formed of perforated sheet material and each having a main annular portion and an inner peripheral portion, said discs being in face-to-face relationship with their outer peripheries in contact and being so shaped and positioned as to provide between the discs an annular space which is triangular in radial cross-section, and a pair of filter discs positioned respectively on the opposite sides of the rigid discs with the filter discs overlying and being connected to one another at the outer peripheries of the rigid discs and with each filter disc covering the entire outer surface of the annular portion of its rigid disc and also projecting radially inwardly and covering said inner peripheral portion of the rigid disc, whereby a filter element is provided which drains inwardly through the two filter discs and through the perforations in the rigid discs into said annular space and thence through said annular space radially inwardly, and whereby filter element may be clamped at said inner peripheral portions with said filter discs in face-to-face relationship with axially aligned filter discs of similar elements so as to form central annular seals.

3. A filter element comprising, a pair of perforated discs of sheet material which is sufficiently rigid to maintain its shape during normal usage without reinforcing means, each of said discs having a main body portion which is frusto-conical and an inner peripheral flange portion, and said discs being so shaped that when they are positioned in face-to-face relationship the outer peripheral portions of the two discs and said flange portions of the two discs mate and hold the discs in spaced relationship with an annular space therebetween, each of said discs having a plurality of spacing bosses which project into said annular space and contact the adjacent surface of the other disc thereby to provide additional rigidity to the discs, and a fabric filter covering the said discs comprising two annular portions which cover the respective outer surfaces of the frusto-conical portions of the perforated discs and which are connected together at their outer periphery and are spaced apart at their inner periphery where they are adapted to provide annular seals.

4. In a filter assembly, the combination of, a casing formed by a main cylindrical shell portion which is closed at one end and open at the other end and a cover portion which mates with and closes said open end, a plurality of rigid disc filter elements axially positioned in a stack within said casing each of which is formed by a pair of rigid discs which define an annular space and which is so shaped that each element contacts the next adjacent element at its inner periphery, each of said filter elements have a fabric filter covering which filters fluid flowing into the annular space and which also provides sealing means at the inner periphery of the filter element, means holding said filter elements in alignment without interfering with the relative angular positions of the filter elements, flange means carried by said casing adapted to engage the inner peripheral portion of one end filter element in the stack, a flanged member positioned at the opposite end of the stack of filter elements and having a flange portion which engages and forms a seal with the inner peripheral portion of the adjacent filter element, and a compression spring resting at one end on said flanged member and resting at the other end on the adjacent wall of said casing and exerting sufficient force through said flanged member onto the stack of filter elements to provide sealing pressure at each inner peripheral surface of each of the filter elements.

5. A filter element comprising, a pair of rigid discs formed of perforated sheet metal and each having a main portion which is frusto-conical with a flange portion at its inner periphery which flange portion is offset axially to provide spacing means, said discs being in face-to-face relationship whereby their flanges are in engagement with each other and their outer peripheries are in engagement with each other and an annular space is provided between the discs which is substantially triangular in radial cross-section, each of said discs having a plurality of radially disposed reinforcing ribs which project alternately from one disc to contact the other, and a pair of felt discs positioned respectively on the opposite sides of the rigid discs with the felt discs overlying and engaging one another at the outer peripheries of the rigid discs and with the felt discs being stitched together at their outer peripheries and spaced apart at their inner periphery where they are adapted to provide annular seals whereby a self-sealing filter element is provided which may drain readily through the perforations in the rigid discs and thence from the annular space at the inner peripheries of the metal discs.

FRANCIS J. ARMSTRONG.

REFERENCES CITED

The following references are of record in the file of this patent:

UNITED STATES PATENTS

| Number | Name | Date |
|---|---|---|
| 444,483 | Breyer | Jan. 13, 1891 |
| 630,363 | Krause | Aug. 8, 1899 |
| 808,043 | Gray | Dec. 19, 1905 |
| 1,061,928 | Seavey | May 13, 1913 |
| 1,370,470 | Martel | Mar. 1, 1921 |
| 1,594,335 | Sweetland | July 27, 1926 |
| 1,989,795 | Fellows | Feb. 5, 1935 |
| 2,088,199 | Gleason | July 27, 1937 |
| 2,210,213 | Long | Aug. 6, 1940 |
| 2,392,354 | Alsop | Jan. 8, 1946 |
| 2,430,078 | Reinsch et al. | Nov. 4, 1947 |
| 2,435,115 | Alsop | Jan. 27, 1948 |
| 2,522,502 | Clark | Sept. 19, 1950 |

FOREIGN PATENTS

| Number | Country | Date |
|---|---|---|
| 177,819 | Great Britain | Apr. 4, 1922 |
| 390,889 | Great Britain | Apr. 20, 1933 |